(12) United States Patent
Chen et al.

(10) Patent No.: US 9,648,585 B2
(45) Date of Patent: May 9, 2017

(54) DATA TRANSMISSION METHOD AND DEVICE

(71) Applicant: CHINA ACADEMY OF TELECOMMUNICATIONS TECHNOLOGY, Beijing (CN)

(72) Inventors: Li Chen, Beijing (CN); Fei Qin, Beijing (CN); Ming Ai, Beijing (CN); Jing Fu, Beijing (CN); Yunjing Hou, Beijing (CN); Fei He, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 164 days.

(21) Appl. No.: 14/370,749

(22) PCT Filed: Dec. 26, 2012

(86) PCT No.: PCT/CN2012/087460
§ 371 (c)(1),
(2) Date: Jul. 3, 2014

(87) PCT Pub. No.: WO2013/102412
PCT Pub. Date: Jul. 11, 2013

(65) Prior Publication Data
US 2015/0003315 A1    Jan. 1, 2015

(30) Foreign Application Priority Data
Jan. 6, 2012 (CN) .......................... 2012 1 0003569

(51) Int. Cl.
*H04W 72/00* (2009.01)
*H04W 4/06* (2009.01)
(Continued)

(52) U.S. Cl.
CPC ......... *H04W 72/005* (2013.01); *H04L 12/185* (2013.01); *H04L 61/2069* (2013.01);
(Continued)

(58) Field of Classification Search
CPC .... H04L 12/185; H04L 61/2069; H04W 4/06; H04W 4/08; H04W 72/005;
(Continued)

(56) References Cited

U.S. PATENT DOCUMENTS 6,965,580 B1 * 11/2005 Takagi ..................... H04B 7/26
370/312
9,209,872 B2 * 12/2015 Stacey ................. H04B 7/0452
(Continued)

FOREIGN PATENT DOCUMENTS

CN            1805557 A       7/2006
CN         102215458 A  *  10/2011    .............. H04W 4/10
(Continued)

OTHER PUBLICATIONS

PCT International Search Report for PCT Counterpart Application No. PCT/CN2012/087460, 5 pgs., (Apr. 4, 2013).
(Continued)

*Primary Examiner* — Un C Cho
*Assistant Examiner* — Shah Rahman
(74) *Attorney, Agent, or Firm* — Blakely, Sokoloff, Taylor & Zafman LLP (57) ABSTRACT

Disclosed are a data transmission method and device, used to solve the problem of achieving air interface group calling and multicasting when a base station is connected to a network side via an IP interface; the data transmission method of the present invention comprises: the base station determines a group air interface identifier corresponding to an IP broadcast address or an IP multicast target address; the base station assigns the air interface identifier to a user
(Continued)

equipment in the group; and the base station schedules and transmits the air interface data via the air interface identifier.

16 Claims, 5 Drawing Sheets

(51) Int. Cl.
| | |
|---|---|
| *H04L 12/18* | (2006.01) |
| *H04L 29/12* | (2006.01) |
| *H04W 4/08* | (2009.01) |
| *H04W 72/04* | (2009.01) |
| *H04W 72/06* | (2009.01) |
| *H04W 72/12* | (2009.01) |
| *H04W 8/26* | (2009.01) |
| *H04W 8/18* | (2009.01) |

(52) U.S. Cl.
CPC ............... *H04W 4/06* (2013.01); *H04W 4/08* (2013.01); *H04W 72/0446* (2013.01); *H04W 8/186* (2013.01); *H04W 8/26* (2013.01); *H04W 72/06* (2013.01); *H04W 72/121* (2013.01)

(58) Field of Classification Search
CPC ........... H04W 72/0446; H04W 72/121; H04W 8/186; H04W 8/26
USPC ........................................................ 370/312
See application file for complete search history.

(56) References Cited

U.S. PATENT DOCUMENTS

| | | | | |
|---|---|---|---|---|
| 2006/0154598 A1* | 7/2006 | Rudland | ............... | H04L 12/185 455/3.01 |
| 2006/0240766 A1* | 10/2006 | Wilde | ................... | H04W 52/32 455/3.01 |
| 2009/0041240 A1* | 2/2009 | Parkvall | ............... | H04W 74/004 380/247 |
| 2009/0268668 A1* | 10/2009 | Tinnakornsrisuphap | | H04L 12/2889 370/328 |
| 2009/0290522 A1* | 11/2009 | Zhou | ..................... | H04L 12/185 370/312 |
| 2011/0038299 A1* | 2/2011 | Sugawara | ............. | H04L 12/189 370/312 |
| 2011/0188598 A1* | 8/2011 | Lee | ...................... | H04B 7/0452 375/267 |
| 2011/0194484 A1* | 8/2011 | Lee | ......................... | H04B 7/155 370/315 |
| 2011/0194511 A1 | 8/2011 | Chen et al. | | |
| 2013/0294326 A1* | 11/2013 | Jiao | ..................... | H04W 76/022 370/312 |

FOREIGN PATENT DOCUMENTS

| | | |
|---|---|---|
| CN | 102547592 A | 7/2012 |
| CN | 102215458 B | 6/2013 |
| WO | WO 2011/100326 A1 | 8/2011 |

OTHER PUBLICATIONS

European Patent Office Communication enclosing Extended European Search Report for corresponding European Patent Application No. 12864330.1, 6 pp., (Mar. 16, 2015).

PCT Written Opinion of the International Search Authority for PCT Counterpart Application No. PCT/CN2012/087460, 13 pp., (Apr. 4, 2013).

PCT Notification Concerning Transmittal of International Preliminary Report on Patentability (Chapter I of the Patent Cooperation Treaty) for PCT Counterpart Application No. PCT/CN2012/087460, 16 pp., (Jul. 17, 2014).

* cited by examiner

DATA TRANSMISSION METHOD AND DEVICE

CROSS-REFERENCE TO RELATED APPLICATIONS

This patent application is a U.S. National Stage under 35 U.S.C. §371 of International Application No. PCT/CN2012/087460, filed on Dec. 26, 2012, entitled DATA TRANSMISSION METHOD AND DEVICE, designating the United States, and claiming priority to Chinese Patent Application No. 201210003569.4, filed with the Chinese Patent Office on Jan. 6, 2012 and entitled "Method of and apparatus for transmitting data", the content of which was incorporated by reference in its entirety.

FIELD

The present invention relates to the field of communications and particularly to a method of and apparatus for transmitting data.

BACKGROUND

Figure 1:
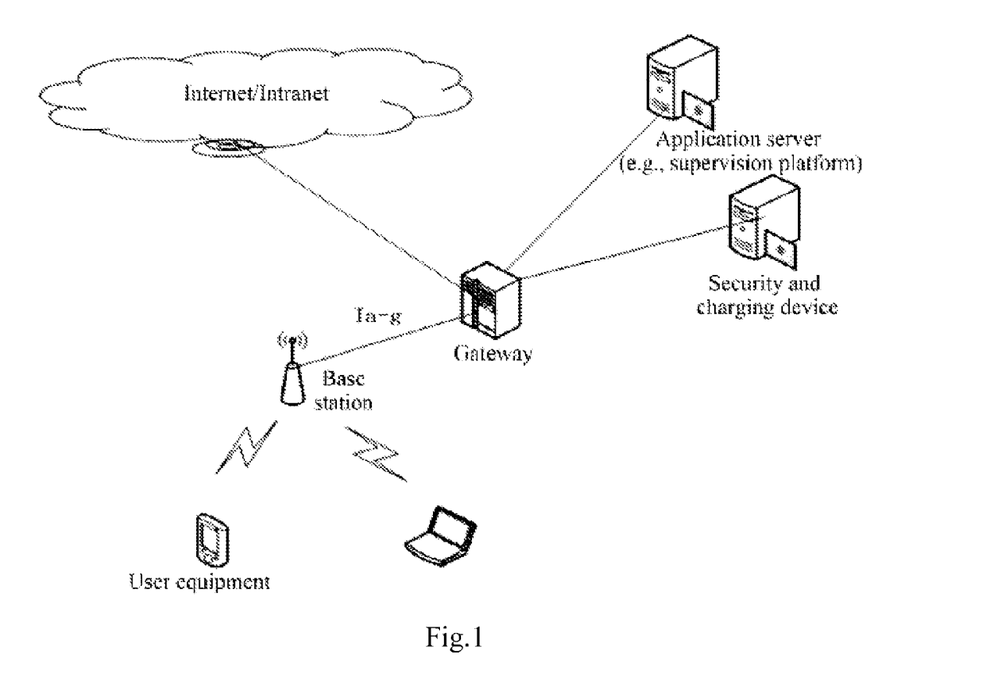
FIG. 1 is a schematic diagram of an architecture for a local IP access of a base station.

In order to lower a cost at the network side and avoid congestion at the network side, in a simplified implementation at the network side, a base station directly accesses an IP network locally or through an Internet Protocol (IP) gateway without any complicated architecture and entities of a core network defined by the $3^{rd}$ Generation Partnership Project (3GPP). FIG. 1 illustrates an example of a simplified architecture for an access of the base station to the network through an IP interface. The base station is also referred to as an Access Point (AP).

Particularly an IP data packet is transferred to the base station, and from the perspective of the IP network, the base station which is an IP router transfers an IP data packet, to be transmitted to a User Equipment (UE), finally to a destination. Unlike a conventional IP network, transmission from the base station to the user equipment is performed via an air interface, and the base station needs to transmit the IP data packet to the destination user equipment in an air interface addressing procedure.

There is a demand for broadcast and group-call/group-cast in cluster and industry private network applications.

Broadcast refers to transmission of information in a network segment by an information source to all of user equipments in the network segment regardless of whether this information is required. Broadcast is typically triggered by a server or a specific user equipment.

Group-call/group-cast refers to concurrent transmission of the same voice, data or video to a group of user equipments, where there is only one calling user equipment and called user equipments are all of user equipments in a group. The contents of data transmitted to the called user equipments are totally duplicated, and the use of a point-to-point transmission scheme requires multiple sets of resources and apparently will result in a waste of resources, so the use of point-to-multipoint transmission is a reasonable scheme to perform group-call and group-cast.

In the IP network, a destination address of IP broadcast is a broadcast address representing hosts throughout the network, and broadcast data is transmitted to user equipments throughout the network.

The IP multicast technology is a TCP/IP network technology to allow one or more hosts (multicast sources) to transmit a single data packet to multiple hosts (at a time and concurrently). Multicast as point-to-multipoint communication is one of effective schemes to save a network bandwidth.

With IP multicast communication dependent an IP multicast destination address, all of hosts receiving a multicast data packet using the same IP multicast destination address constitute a group of hosts, also referred to as a multicast group. A member in a multicast group may be altered at any time, and a host may belong to several multicast group.

To perform group-call/group-cast transmission in the private network, in addition to operations at the IP layer, IP-based cluster and industry private network applications require a group planed by a higher layer (e.g., the application layer), and joining or quitting of a group member is decided by an application server, and only user equipments in a group can send multicast transmission in the group.

Via an air interface, transmission between a base station and a user equipment is addressed and identified by a user equipment specific identity, i.e., a Cell Radio Network Temporary Identity (C-RNTI). The base station scrambles a scheduling command and downlink transmission data by the C-RNTI, and the user equipment receives downlink transmission and descrambles the scheduling command and the downlink transmission data by its own C-RNTI to receive scheduling and the downlink transmission, and the other user equipments can not receive the downlink scheduling and transmission of the user equipment due to their different C-RNTIs; and in the uplink direction, the user equipment scrambles uplink data by the C-RNTI so that the base station can better distinguish the user equipment from the others in reception of the uplink data.

However there has been absent so far a technology to perform IP broadcast and IP multicast transmission via an air interface, that is, a mechanism to perform IP broadcast and IP multicast transmission via an air interface in a wireless communication system where a base station accesses a network via an IP interface.

SUMMARY

Embodiments of the invention provide a method of and apparatus for transmitting data so as to address the problem of implementation of group-call and group-cast via an air interface when a base station is connected with the network side via an IP interface.

A method of transmitting data according to an embodiment of the invention includes:

determining, by a base station, a group air interface identity corresponding to an IP broadcast address or an IP multicast destination address;

configuring, by the base station, user equipments in a group with the group air interface identity; and scheduling, by the base station, and transmitting data via an air interface using the group air interface identity.

A method of transmitting data according to an embodiment of the invention includes:

obtaining, a user equipment, a group air interface identity, configured by a base station, which corresponds to an IP broadcast address or an IP multicast destination address; and receiving, by the user equipment, an IP broadcast data packet or an IP multicast data packet using the group air interface identity.

An apparatus for transmitting data according to an embodiment of the invention includes:

a group air interface identity determination unit configured to determine a group air interface identity corresponding to an IP broadcast address or an IP multicast destination address;

a group air interface identity configuration unit configured to configure user equipments in a group with the group air interface identity; and a scheduling and transmission unit configured to schedule and transmit data via an air interface using the group air interface identity.

An apparatus for transmitting data according to an embodiment of the invention includes:

a group air interface identity obtainment unit configured to obtain a group air interface identity, configured by a base station, which corresponds to an IP broadcast address or an IP multicast destination address; and a reception unit is configured to receive an IP broadcast data packet or an IP multicast data packet using the group air interface identity.

The embodiments of the invention provide a method of and apparatus for transmitting data, where a base station determines a group air interface identity corresponding to an IP broadcast address or an IP multicast destination address; the base station configures user equipments in a group with the group air interface identity; and the base station schedules and transmits data via an air interface using the group air interface identity for the purpose of group-call and group-cast of the data via the air interface where the base station is connected with the network side via an IP interface.

DETAILED DESCRIPTION OF THE EMBODIMENTS

Embodiments of the invention provide a method of and apparatus for transmitting data so as to address the problem of implementation of group-call and group-cast via an air interface when a base station is connected with the network side via an IP interface.

The embodiments of the invention address the problem of implementation of group-call and group-cast via an air interface when a base station is connected with the network side via an IP interface.

The embodiments of the invention propose that a base station maps an IP broadcast or IP multicast destination address to an air interface identity, allocates the air interface identity to all of user equipments receiving data at the IP broadcast or IP multicast destination address and schedules and transmits the data via an air interface using the air interface identity.

Figure 2:
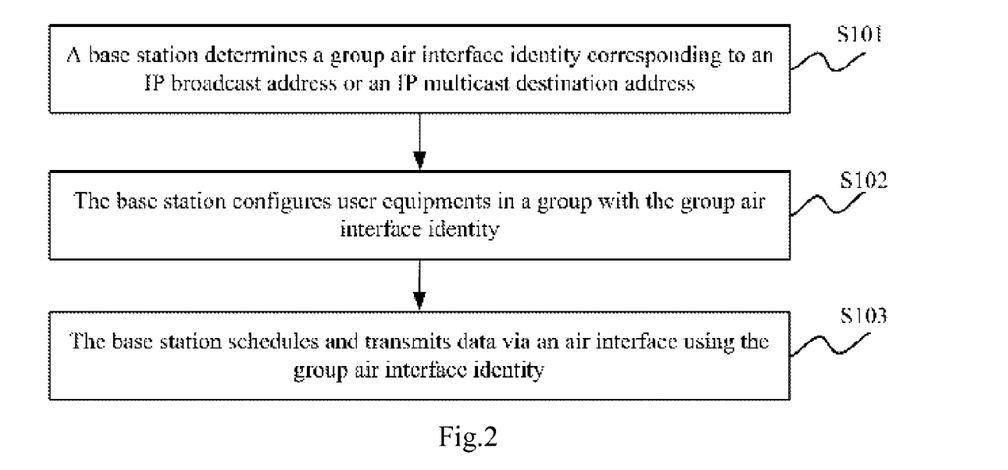
FIG. 2 is a schematic diagram of a general flow of a method of transmitting data according to an embodiment of the invention.

Referring to FIG. 2, a method of transmitting data according to an embodiment of the invention includes the following steps:

S101. A base station determines a group air interface identity corresponding to an IP broadcast address or an IP multicast destination address;

S102: The base station configures user equipments in a group with the group air interface identity; and S103: The base station schedules and transmits data via an air interface using the group air interface identity.

Preferably the group air interface identity corresponds one-to-one to the IP broadcast address or the IP multicast destination address.

Preferably the group air interface identity is a Group Radio Network Temporary Identity (G-RNTI).

Preferably the base station configures the user equipments in the group with the group air interface identity as follows:

The base station receives requests sent from the user equipments to join an IP multicast group and determines the user equipments in the IP multicast group; or the base station receives a notification of a network-side entity and determines the user equipments in the IP multicast group; and The base station transmits the group air interface identity corresponding to the IP multicast group to each user equipment in the IP multicast group in an air interface uni-cast transmission mode.

Preferably the base station transmits the group air interface identity corresponding to the IP multicast group to each user equipment in a downlink transmission bearer configuration command scrambled by a respective Cell Radio Network Temporary Identity (C-RNTI) of the user equipment.

That is, the base station transmits the group air interface identity corresponding to the IP multicast group to each user equipment in the IP multicast group in the air interface uni-cast transmission mode particularly as follows:

For each user equipment in the IP multicast group, the base station transmits the group air interface identity corresponding to the IP multicast group to the user equipment in a downlink transmission bearer configuration command scrambled by a Cell Radio Network Temporary Identity (C-RNTI) of the user equipment.

Preferably the downlink transmission bearer configuration command is Radio Resource Control (RRC) signaling, a user plane signaling Media Access Control plane Control Element (MAC CE) or physical layer signaling carried by a Physical Downlink Control Channel (PDCCH).

Preferably the base station schedules and transmits data via the air interface using the group air interface identity as follows:

The base station schedules and transmits data via the air interface over a specific group channel using the group air interface identity;

Where the specific group channel includes a logic channel Group Control Channel (GCCH), a logic channel Group Traffic Channel (GTCH) and a transport channel Group Channel (GCH), where the GCCH is configured to carry air interface configuration information of an IP multicast group, the GTCH is configured to carry IP multicast data packets with the same IP multicast destination address and with the same or similar transmission characteristics (i.e., transmission characteristics in the same range); and the GCH is a point-to-multipoint transport channel configured to transport IP multicast data to all of user equipments in a group.

Preferably the transmission characteristic includes a traffic priority and/or a Quality of Service (QoS) requirement, where the QoS requirement includes, for example, a delay, a packet loss ratio, etc.

Stated otherwise, the IP multicast data packets with the same or similar transmission characteristics can be IP multicast data packets with the same or similar traffic priorities, or can be IP multicast data packets with both the same or similar traffic priorities and QoS requirements, or can be IP multicast data packets with the same or similar QoS requirements.

Where the IP multicast data packets with the transmission characteristics in the same range refer to, for example, IP multicast data packets with higher QoS requirement levels or IP multicast data packets with lower QoS requirement levels; or The traffic priorities are divided in advance into multiple levels, and the GTCH is configured to carry IP multicast data packets with the same IP multicast destination address and with traffic priorities at the same level.

Where the IP multicast data packets with the same QoS requirement refer to, for example, those with IP headers including the same specified type of TOS fields.

Preferably the GCCH and the GTCH are mapped to the GCH and further mapped to a Physical Downlink Shared Channel (PDSCH); or The GCCH and the GTCH are mapped to a Downlink Shared Channel (DL-SCH) and further mapped to a Physical Downlink Shared Channel (PDSCH).

Preferably the base station schedules the user equipments in the same group to receive the same data via the air interface at the same time-frequency resource location.

Correspondingly at the user equipment side, an embodiment of the invention provides a method of transmitting data, the method including:

A user equipment obtains a group air interface identity, configured by a base station, which corresponds to an IP broadcast address or an IP multicast destination address; and The user equipment receives an IP broadcast data packet or an IP multicast data packet using the group air interface identity.

Preferably the user equipment obtains the group air interface identity configured by the base station as follows:

The user equipment enters a connected status and obtains a Cell Radio Network Temporary Identity (C-RNTI) configured by the base station; and The user equipment receives a configuration command sent from the base station and obtains a G-RNTI corresponding to the IP broadcast address.

Typically the configuration command sent from the base station needs to be scrambled by the C-RNTI, and the user equipment receives the configuration command according to the C-RNTI configured by the base station and further obtains the G-RNTI corresponding to the IP broadcast address.

Preferably the user equipment obtains the group air interface identity configured by the base station as follows:

The user equipment enters a connected status and obtains a Cell Radio Network Temporary Identity (C-RNTI) configured by the base station;

The user equipment transmits uplink data, which carries a request to join an IP multicast group, using the C-RNTI as an air interface transmission identity; and The user equipment receives a configuration command sent from the base station and determines a G-RNTI corresponding to the IP multicast destination address of the IP multicast group to which the user equipment belongs.

Typically the configuration command sent from the base station needs to be scrambled by the C-RNTI, and the user equipment receives the configuration command according to the C-RNTI configured by the base station and further obtains the G-RNTI corresponding to the IP broadcast address of the IP multicast group to which the user equipment belongs.

A detailed description will be given below with reference to the drawings.

A technical solution according to an embodiment of the invention particularly includes the following three aspects:

Firstly a base station allocates a group air interface identity, i.e., a Group Radio network Temporary Identity (G-RNTI), and configures it to user equipments in a group, which receive IP broadcast or IP multicast transmission; and a G-RNTI corresponds to an IP multicast destination address or an IP broadcast address.

Secondly an IP broadcast or IP multicast data packet is transmitted over a specific group channel.

Thirdly the base station schedules and transmits the IP broadcast or IP multicast data packet using the G-RNTI, and the user equipments each receive the IP broadcast or IP multicast data packet using the G-RNTI. The IP broadcast or IP multicast data packet is transmitted via an air interface in a multicast mode, that is, all the user equipments receiving the IP data packet are all of user equipments served by the AP from the perspective of IP broadcast or user equipments in the group, which receive the same IP data packet at the same time-frequency resource location from the perspective of IP multicast.

A method of configuring a G-RNTI according to an embodiment of the invention will be introduced below.

At the base station side:

A base station allocates a C-RNTI for each user equipment, where the C-RNTI is unique throughout a cell and an air interface identity of the user equipment in the cell. Each C-RNTI corresponds to an IP uni-cast destination address of the user equipment (as in an existing LTE procedure).

The base station determines an IP broadcast address or an IP multicast destination address to which a G-RNTI corresponds. For IP multicast transmission, the base station determines user equipments to receive the IP multicast destination address.

The base station determines the user equipments to join an IP multicast group as follows:

The base station receives uplink data transmitted from a user equipment and when forwarding an IP data packet by an IP routing function, the base station parses signaling sent from the user equipment to join the IP multicast group and determines the user equipment to be a user equipment belonging to the group; or A network-side entity, e.g., an application server, notifies the base station of the user equipments to join the IP multicast group.

The base station configures the G-RNTI in air interface uni-cast transmission respectively to each user equipment to join the IP multicast group. The mode of configuration is to scramble a downlink transmission bearer configuration command by the respective C-RNTI of each user equipment, where the downlink transmission bearer configuration command is Radio Resource Control (RRC) signaling, a user plane signaling Media Access Control plane Control Element (MAC CE) or physical layer signaling carried by a Physical Downlink Control Channel (PDCCH).

At the user equipment side:

For IP broadcast data reception:

The user equipment enters a connected status and obtains the configured C-RNTI (as in an existing LTE procedure); and The user equipment receives the configuration command sent from the base station and obtains the G-RNTI corresponding to the IP broadcast address.

For IP multicast data reception:

The user equipment enters a connected status and obtains the configured C-RNTI (as in an existing LTE procedure);

The user equipment sends uplink data transmission, which carries the signaling to join the IP multicast group, using the C-RNTI as the air interface transmission identity; and The base station receives the configuration command sent from the base station and obtains the G-RNTI corresponding to the IP multicast destination address corresponding to the IP multicast group.

It shall be noted that the base station allocates the C-RNTI and schedules uni-cast transmission for the user equipment as in an existing LTE procedure.

Transmission of an IP multicast data packet via an air interface according to an embodiment of the invention will be described below.

The following channels may be introduced for multicast transmission via an air interface:

A logic channel, i.e., a Group Control Channel (GCCH), where each GCCH corresponds to an IP multicast group. The IP multicast group is characterized by the same IP multicast destination address. The GCCH is configured to carry air interface configuration information of an IP multicast group, e.g., logic channel configuration information, etc. If the multicast air interface configuration information is carried by a uni-cast control channel, that is, it is configured respectively to all of user equipments in the group in the uni-cast form, or there is no air interface multicast information to be explicitly configured, for example, the air interface configuration information is configured by default, then there may be no logic channel GCCH.

A logic channel, i.e., a Group Traffic Channel (GTCH), where each GTCH corresponds to a type of IP multicast data packet and is configured to transmit the type of IP multicast data packet. The same type of data packet mapped to a GTCH is characterized by the same IP multicast destination address and optionally the same specific field, e.g., Type of Service (TOS) field, in an IP header.

A transport channel, i.e., a Group Channel (GCH), where multiple GTCHs transmitted to the same group of user equipments can be mapped onto a GCH for transmission. If a multicast logic channel is mapped to a transport channel, i.e., a Downlink Shared Channel (DL-SCH), then there may be no GCH.

Figure 3:
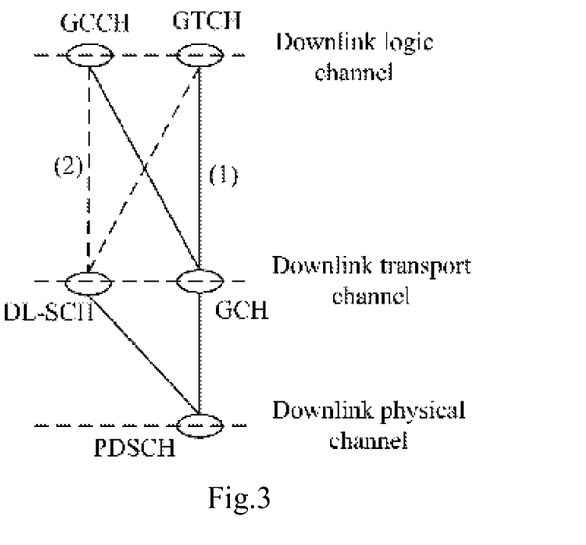
FIG. 3 is a schematic diagram of a multicast channel mapping relationship according to an embodiment of the invention.

Referring to FIG. 3, multicast channels are mapped in a relationship of the following two forms:

1. Logic channels GCCH and GTCH are mapped to a transport channel GCH and further to a physical channel, i.e. a Physical Downlink Shared Channel (PDSCH); and 2. Logic channels GCCH and GTCH are mapped to a transport channel DL-SCH and further to a physical channel PDSCH.

It shall be noted that the DL-SCH and the PDSCH are existing channels in an LTE system, and mapping of the DL-SCH to the PDSCH is as in an existing process in the LTE system.

Several particular embodiments will be described below:

A first embodiment relates to allocation of a G-RNTI (IP multicast transmission).

Figure 4:
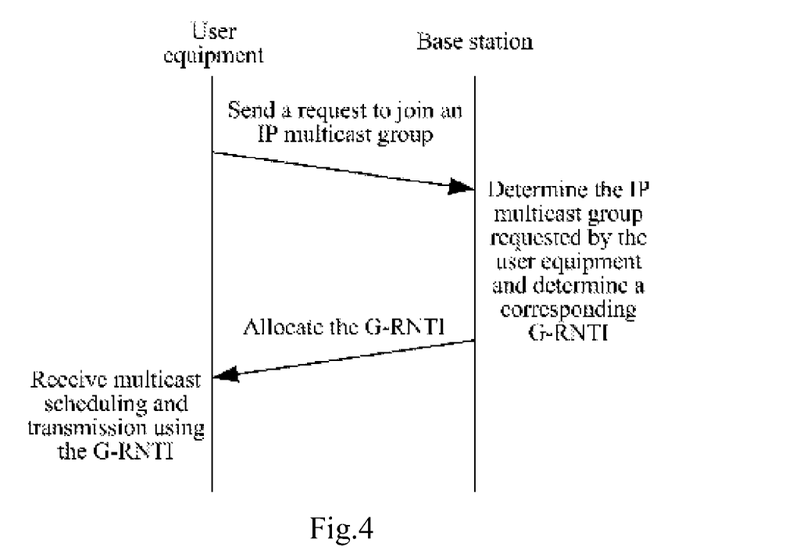
FIG. 4 is a schematic diagram of a multicast implementation flow according to a first embodiment of the invention.

Referring to FIG. 4, a process flow at the base station side includes the following steps:

The step 1 is to receive via an air interface an IP data packet transmitted from a user equipment in the uplink;

The step 2 is to parse the IP data packet for a request to join an IP multicast group, and to associate a G-RNTI with the IP multicast group; and The step 3 is to allocate the G-RNTI to the user equipment in uni-cast transmission via a configuration command which can be RRC signaling, a user plane signaling Media Access Control plane Control Element (MAC CE) or physical layer signaling carried by a Physical Downlink Control Channel (PDCCH).

Alternatively a process flow at the base station side includes the following steps:

The step 1 is to receive information notified of by a network-side entity about an IP multicast group to which a user equipment belongs;

The step 2 is to allocate a G-RNTI to the user equipment in uni-cast transmission via a configuration command which can be RRC signaling, a user plane signaling Media Access Control plane Control Element (MAC CE) or physical layer signaling carried by a Physical Downlink Control Channel (PDCCH).

Referring to FIG. 4, a process flow at the user equipment side includes the following steps:

The step 1 is to send the IP data packet in the uplink, where the IP data packet contains the request to join an IP multicast group and can be transmitted over a radio bearer over which application layer signaling is sent or over another specified default ratio bearer.

The step 2 is to receive the signaling from the base station and to determine the G-RNTI for transmission via the air interface in the IP multicast group.

The step 3 is to receive group-cast scheduling and transmit data using the G-RNTI.

Figure 5:
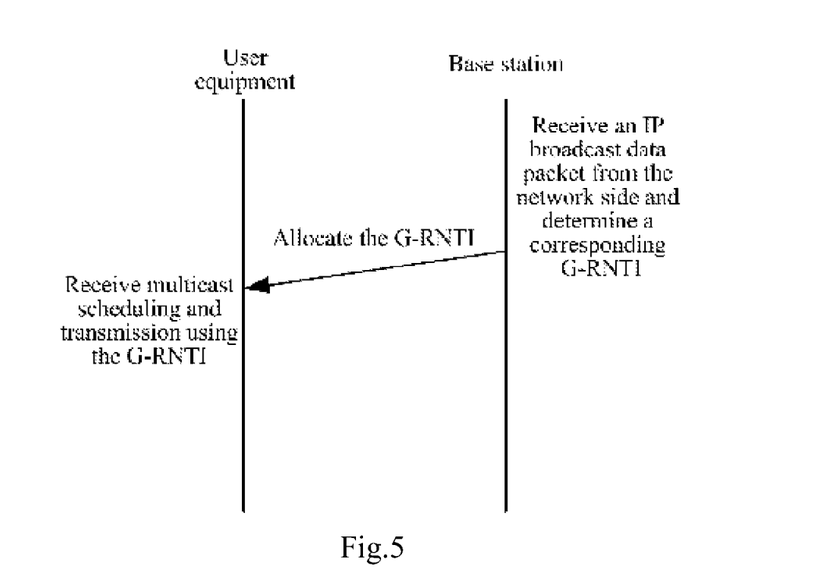
FIG. 5 is a schematic diagram of a multicast implementation flow according to a second embodiment of the invention.

A second embodiment relates to allocation of a G-RNTI (IP broadcast transmission) with reference to FIG. 5.

A process flow at the base station side includes the following steps:

The step 1 is to receive an IP broadcast data packet sent from the network side, that is, with a destination IP address which is a broadcast address; and The step 2 is to allocate a G-RNTI to the user equipment in uni-cast transmission via a configuration command which can be RRC signaling, a user plane signaling Media Access Control plane Control Element (MAC CE) or physical layer signaling carried by a Physical Downlink Control Channel (PDCCH).

A process flow at the user equipment side includes the following steps:

The step 1 is to receive the signaling from the base station and to determine the G-RNTI.

The step 2 is to receive group-cast scheduling and transmission using the G-RNTI and to finally parse the IP data packet so that the user equipment determines the IP data packet to be transmission of broadcast data.

Figure 6:
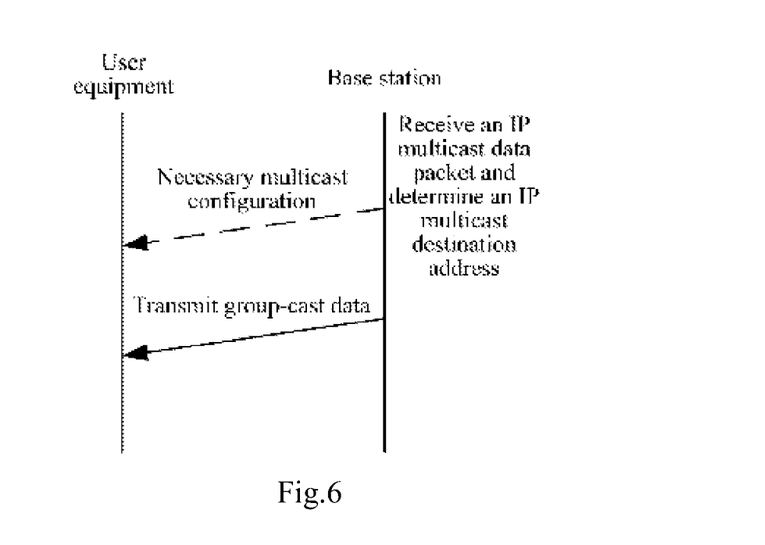
FIG. 6 is a schematic diagram of a multicast implementation flow according to a third embodiment of the invention.

A third embodiment relates to transmission of an IP multicast data packet via an air interface (transmission of a first IP multicast data packet) with reference to FIG. 6.

A process flow at the base station side includes the following steps:

The step 1 is to receive an IP multicast data packet and to determine an IP multicast destination address.

The step 2 is to configure multicast configuration information.

Where the multicast configuration information is configured in the following three schemes:

Default configuration, where, for example, a logic channel number corresponding to a Data Radio Bearer (DRB) is reserved to correspond respectively to transmission of a different type of IP data packet in the same group, for example, a logic channel number corresponds to a TOS value in an IP header. Other configuration of a logic channel is also specified by a default value as defined in the protocol.

Uni-cast, where the multicast configuration information is configured in uni-cast RRC signaling: the base station allocates group-cast DRB configuration respectively to all of user equipments in the group in C-RNTI scrambled downlink transmission.

Group-cast, where a group logic channel GCCH is introduced, and group-cast configuration information including logic channel configuration corresponding to a DRB, etc., is transmitted over the GCCH, and scheduling and transmission of the GCCH is identified by a G-RNTI. A logic channel number of the GCCH is configured by default.

The step 3 is to schedule transmission of the IP multicast data packet using the G-RNTI, wherein the IP multicast data packet is carried over the logic channel configured in the step 2.

A process flow at the user equipment side includes the following steps:

The step 1 is to monitor scheduling of a PDCCH using the G-RNTI to read a multicast scheduling command.

The step 2 is to receive the multicast configuration information, particularly in the following three schemes:

Default configuration, where the adopted multicast configuration is the default configuration as defined in the protocol, and in this scheme, the operation in the step 2 will be skipped.

Uni-cast RRC signaling configuration, where the user equipment receives the uni-cast RRC signaling and obtains the multicast configuration information including the logic channel number, etc.

Group-cast, where the user equipment monitors a PDCCH using the G-RNTI and reads the group-cast logic channel GCCH from the configuration command to thereby obtain the multicast configuration information.

The step 3 is to monitor a PDCCH scrambled by the G-RNTI, to obtain an IP multicast transmission scheduling command and to receive the IP multicast data transmission.

Figure 7:
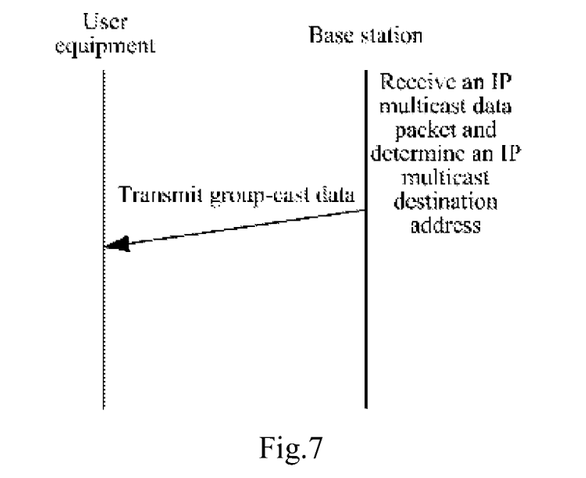
FIG. 7 is a schematic diagram of a multicast implementation flow according to a fourth embodiment of the invention.

A fourth embodiment relates to transmission of an IP multicast data packet via an air interface with reference to FIG. 7.

A process flow at the base station side includes the following steps:

The step 1 is to receive an IP multicast data packet and to determine an IP multicast destination address.

The step 2 is to schedule transmission of the IP multicast data packet using a G-RNTI, wherein the IP multicast data packet is carried over a configured logic channel.

A process flow at the user equipment side includes the following steps:

The step 1 is to monitor scheduling of a PDCCH using the G-RNTI to read a multicast scheduling command.

The step 2 is to monitor a PDCCH scrambled by the G-RNTI, to obtain an IP multicast transmission scheduling command and to receive the IP multicast data transmission.

Figure 8:
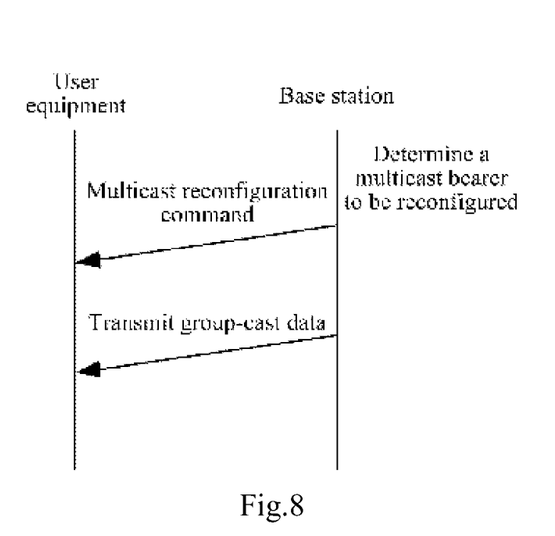
FIG. 8 is a schematic diagram of a multicast implementation flow according to a fifth embodiment of the invention.

A fifth embodiment relates to transmission of an IP multicast data packet via an air interface (with an air interface bearer being modified) with reference to FIG. 8.

The fifth embodiment is applicable only to a scenario with explicit configuration of a multicast bearer in the following schemes:

Uni-cast, where a multicast configuration is configured by uni-cast RRC signaling: a base station allocates group-cast configuration respectively to all of user equipments in a group in C-RNTI scrambled downlink transmission; or Group-cast, where a group logic channel GCCH is introduced, and group-cast configuration information including logic channel configuration, etc., is transmitted over the GCCH, and scheduling and transmission of the GCCH is identified by a G-RNTI. A logic channel number of the GCCH is configured by default.

A process flow at the base station side includes the following steps:

The step 1 is to make a decision to update an air interface bearer, including:

An IP data packet of a new type is received, that is, a data packet with an IP header including a field, which occurs for the first time, to indicate a data logic channel (a Data Radio Bearer (DRB)), and a DRB is determined to be added; or No data has been transmitted over a specific DRB for a counted length of time, and the DRB is determined to be deleted; or A transmission characteristic of a specific DRB is altered, and air interface parameter configuration of the DRB needs to be updated.

The step 2 is to send a reconfiguration command, including:

Uni-cast, where group-cast reconfiguration is configured by uni-cast RRC signaling: the base station allocates group-cast reconfiguration information respectively to all of user equipments in the group via the reconfiguration command in C-RNTI scrambled downlink transmission; or Group-cast, where a group logic channel GCCH is transmitted, and group-cast configuration information including logic channel configuration, etc., is transmitted over the GCCH.

The step 3 is to schedule transmission of the IP multicast data packet using the G-RNTI, wherein the IP multicast data packet is carried over the logic channel configured in the step 2.

A process flow at the user equipment side includes the following steps:

The step 1 is to monitor scheduling of a PDCCH using the G-RNTI to read a multicast scheduling command.

The step 2 is to receive the multicast configuration information, including:

Uni-cast, i.e., uni-cast RRC signaling configuration, where the user equipment receives the uni-cast RRC reconfiguration signaling and obtains the multicast configuration information including the logic channel number, etc; or Group-cast, where the user equipment monitors a PDCCH using the G-RNTI and reads the group-cast logic channel GCCH in accordance with the configuration command to thereby obtain the multicast configuration information.

The step 3 is to monitor a PDCCH scrambled by the G-RNTI, to obtain an IP multicast transmission scheduling command and to receive the IP multicast data transmission.

Figure 9:
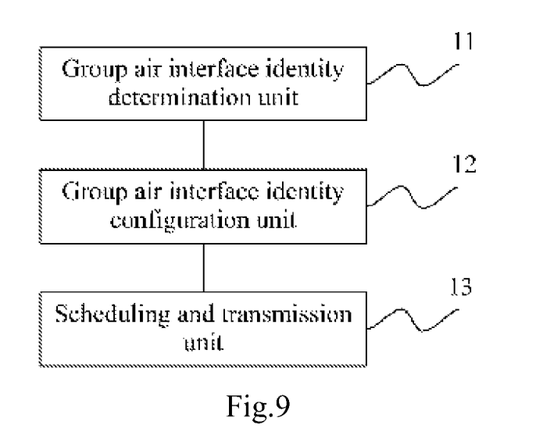
FIG. 9 is a schematic structural diagram of an apparatus for transmitting data according to an embodiment of the invention.

At the base station side, referring to FIG. 9, an embodiment of the invention provides an apparatus for transmitting data, the apparatus including:

A group air interface identity determination unit 11 is configured to determine a group air interface identity corresponding to an IP broadcast address or an IP multicast destination address;

A group air interface identity configuration unit 12 is configured to configure user equipments in a group with the group air interface identity; and A scheduling and transmission unit 13 is configured to schedule and transmit data via an air interface using the group air interface identity.

Preferably the group air interface identity corresponds one-to-one to the IP broadcast address or the IP multicast destination address.

Preferably the group air interface identity is a Group Radio Network Temporary Identity (G-RNTI).

Preferably the group air interface identity configuration unit 12 is particularly configured:

To receive requests sent from the user equipments to join an IP multicast group and to determine the user equipments in the IP multicast group; or to receive a notification of a network-side entity and to determine the user equipments in the IP multicast group; and To transmit the group air interface identity corresponding to the IP multicast group to each user equipment in the IP multicast group in an air interface uni-cast transmission mode.

Preferably the group air interface identity configuration unit 12 transmits the group air interface identity corresponding to the IP multicast group to each user equipment in a downlink transmission bearer configuration command scrambled by a respective Cell Radio Network Temporary Identity (C-RNTI) of the user equipment.

That is, the group air interface identity configuration unit transmits the group air interface identity corresponding to the IP multicast group to each user equipment in the IP multicast group in the air interface uni-cast transmission scheme particularly as follows:

For each user equipment in the IP multicast group, the group air interface identity corresponding to the IP multicast group is transmitted to the user equipment in a downlink transmission bearer configuration command scrambled by a Cell Radio Network Temporary Identity (C-RNTI) of the user equipment.

Preferably the downlink transmission bearer configuration command is Radio Resource Control (RRC) signaling, a user plane signaling Media Access Control plane Control Element (MAC CE) or physical layer signaling carried by a Physical Downlink Control Channel (PDCCH).

Preferably the scheduling and transmission unit 13 is particularly configured:

To schedule and transmit data via the air interface over a specific group channel using the group air interface identity;

Where the specific group channel includes a logic channel Group Control Channel (GCCH), a logic channel Group Traffic Channel (GTCH) and a transport channel Group Channel (GCH), where the GCCH is configured to carry air interface configuration information of an IP multicast group, the GTCH is configured to carry IP multicast data packets with the same IP multicast destination address and with the same or similar transmission characteristics (i.e., transmission characteristics in the same range); and the GCH is a point-to-multipoint transport channel configured to transport IP multicast data to all of user equipments in a group.

Preferably the transmission characteristic includes a traffic priority and/or a Quality of Service (QoS) requirement.

Preferably the GCCH and the GTCH are mapped to the GCH and further to a Physical Downlink Shared Channel (PDSCH); or The GCCH and the GTCH are mapped to a Downlink Shared Channel (DL-SCH) and further to a Physical Downlink Shared Channel (PDSCH).

Preferably the scheduling and transmission unit 13 schedules the user equipments in the same group to receive the same data via the air interface at the same time-frequency resource location.

Correspondingly at the user equipment side, an embodiment of the invention provides an apparatus for transmitting data, the apparatus including:

A group air interface identity obtainment unit is configured to obtain a group air interface identity, configured by a base station, which corresponds to an IP broadcast address or an IP multicast destination address; and A reception unit is configured to receive an IP broadcast data packet or an IP multicast data packet using the group air interface identity.

Preferably the group air interface identity corresponds one-to-one to the IP broadcast address or the IP multicast destination address.

Preferably the group air interface identity is a Group Radio Network Temporary Identity (G-RNTI).

Preferably the group air interface identity obtainment unit is particularly configured:

To enable a user equipment to enter a connected status and to obtain a Cell Radio Network Temporary Identity (C-RNTI) configured by the base station; and To receive a configuration command sent from the base station and to obtain a G-RNTI corresponding to the IP broadcast address.

Preferably the group air interface identity obtainment unit is particularly configured:

To enable a user equipment to enter a connected status and to obtain a Cell Radio Network Temporary Identity (C-RNTI) configured by the base station; and To transmit uplink data, carrying a request to join an IP multicast group, using the C-RNTI as an air interface transmission identity; and To receive a configuration command sent from the base station and to determine a G-RNTI corresponding to the IP multicast destination address of the IP multicast group to which the user equipment belongs.

In summary, in the embodiments of the invention, a base station maps an IP broadcast or IP multicast destination address to an air interface identity, allocates the air interface identity to all of user equipments receiving the IP broadcast or IP multicast transmission and schedules and transmits the data via an air interface using the air interface identity, thus offering a method of carrying on IP broadcast and IP multicast transmission of an IP network via an air interface to perform multicast transmission, by a base station accessing the IP network, via the air interface Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of transmitting data, the method comprising:
determining, by a base station, a group air interface identity corresponding to an Internet Protocol, IP, broadcast address or an IP multicast destination address, wherein the group air interface identity is a Group Radio Network Temporary Identity, G-RNTI, wherein the base station is connected with a network side via an IP interface;
configuring, by the base station, user equipments in a group with the group air interface identity, wherein the base station configuring the group air interface identity comprises: the base station transmitting the group air interface identity to each of the user equipments in the group in a downlink transmission bearer configuration command scrambled by a Cell Radio Network Temporary Identity, C-RNTI, of the user equipment;
scheduling, by the base station, and transmitting data via an air interface using the group air interface identity;
wherein scheduling, by the base station, and transmitting data via the air interface using the group air interface identity comprises:
scheduling, by the base station, and transmitting data via the air interface over a specific group channel using the group air interface identity;
wherein the specific group channel includes a logic channel Group Control Channel, GCCH, a logic channel Group Traffic Channel, GTCH, and a transport channel Group Channel, GCH, wherein the GCCH is configured to carry air interface configuration information of an IP multicast group, the GTCH is configured to carry IP multicast data packets with a same IP multicast destination address and with a same transmission characteristic or transmission characteristics in a same range; and the GCH is a point-to-multipoint transport channel configured to transport IP multicast data to all of user equipments in a group; and
wherein the GCCH and the GTCH are mapped to the GCH and further to a Physical Downlink Shared Channel, PDSCH; or the GCCH and the GTCH are mapped to a Downlink Shared Channel, DL-SCH, and further to a Physical Downlink Shared Channel, PDSCH.

2. The method according to claim 1, wherein the group air interface identity corresponds one-to-one to the IP broadcast address or the IP multicast destination address.

3. The method according to claim 1, wherein configuring by the base station the user equipments in the group with the group air interface identity comprises:
receiving, by the base station, requests sent from the user equipments to join an IP multicast group and determining the user equipments in the IP multicast group; or
receiving, by the base station, a notification of a network-side entity and determining the user equipments in the IP multicast group; and
transmitting, by the base station, the group air interface identity corresponding to the IP multicast group to each user equipment in the IP multicast group in an air interface uni-cast transmission mode.

4. The method according to claim 1, wherein the base station schedules the user equipments in the same group to receive the same data via the air interface at the same time-frequency resource location.

5. A method of transmitting data, the method comprising:
obtaining, by a user equipment, a group air interface identity, configured by a base station, which corresponds to an IP broadcast address or an IP multicast destination address, wherein the group air interface identity is a Group Radio Network Temporary Identity, G-RNTI, wherein the base station is connected with a network side via an IP interface;
receiving, by the user equipment, an IP broadcast data packet or an IP multicast data packet using the group air interface identity,
wherein the base station configuring the group air interface identity comprises: the base station transmitting the group air interface identity to the user equipment in a downlink transmission bearer configuration command scrambled by a Cell Radio Network Temporary Identity, C-RNTI, of the user equipment;
wherein the IP broadcast data packet or the IP multicast data packet is transmitted data via an air interface over a specific group channel using the group air interface identity by the base station;

wherein the specific group channel includes a logic channel Group Control Channel, GCCH, a logic channel Group Traffic Channel, GTCH, and a transport channel Group Channel, GCH, wherein the GCCH is configured to carry air interface configuration information of an IP multicast group, the GTCH is configured to carry IP multicast data packets with a same IP multicast destination address and with a same transmission characteristic or transmission characteristics in a same range; and the GCH is a point-to-multipoint transport channel configured to transport IP multicast data to all of user equipments in a group; and wherein the GCCH and the GTCH are mapped to the GCH and further to a Physical Downlink Shared Channel, PDSCH; or the GCCH and the GTCH are mapped to a Downlink Shared Channel, DL-SCH, and further to a Physical Downlink Shared Channel, PDSCH.

6. The method according to claim 5, wherein the group air interface identity corresponds one-to-one to the IP broadcast address or the IP multicast destination address.

7. The method according to claim 6, wherein obtaining, by the user equipment, the group air interface identity configured by the base station comprises:
   entering, by the user equipment, a connected status and obtaining the Cell Radio Network Temporary Identity, C-RNTI, configured by the base station; and
   receiving, the user equipment, a configuration command sent from the base station and obtaining the G-RNTI corresponding to the IP broadcast address.

8. The method according to claim 6, wherein obtaining, by the user equipment, the group air interface identity configured by the base station comprises:
   entering, by the user equipment, a connected status and obtaining the Cell Radio Network Temporary Identity, C-RNTI, configured by the base station; and
   transmitting, by the user equipment, uplink data, carrying a request to join an IP multicast group, using the C-RNTI as an air interface transmission identity; and
   receiving, by the user equipment, a configuration command sent from the base station and determining the G-RNTI corresponding to the IP multicast destination address of the IP multicast group to which the user equipment belongs.

9. An apparatus for transmitting data, wherein the apparatus is connected with a network side via an IP interface, the apparatus comprising:
   a processor configured to determine a group air interface identity corresponding to an Internet Protocol, IP, broadcast address or an IP multicast destination address, wherein the group air interface identity is a Group Radio Network Temporary Identity, G-RNTI;
   a transceiver configured to configure user equipments in a group with the group air interface identity, and to schedule and transmit data via an air interface using the group air interface identity; and
   wherein the transceiver is configured to transmit the group air interface identity to each of the user equipments in the group in a downlink transmission bearer configuration command scrambled by a Cell Radio Network Temporary Identity, C-RNTI, of the user equipment;
   wherein the transceiver is further configured:
   to schedule and transmit data via the air interface over a specific group channel using the group air interface identity;
   wherein the specific group channel includes a logic channel Group Control Channel, GCCH, a logic channel Group Traffic Channel, GTCH, and a transport channel Group Channel, GCH, wherein the GCCH is configured to carry air interface configuration information of an IP multicast group, the GTCH is configured to carry IP multicast data packets with a same IP multicast destination address and with a same transmission characteristic or transmission characteristics in a same range; and the GCH is a point-to-multipoint transport channel configured to transport IP multicast data to all of user equipments in a group; and wherein the GCCH and the GTCH are mapped to the GCH and further mapped to a Physical Downlink Shared Channel, PDSCH; or the GCCH and the GTCH are mapped to a Downlink Shared Channel, DL-SCH, and further mapped to a Physical Downlink Shared Channel, PDSCH.

10. The apparatus according to claim 9, wherein the group air interface identity corresponds one-to-one to the IP broadcast address or the IP multicast destination address.

11. The apparatus according to claim 9, wherein the transceiver is further configured:
   to receive requests sent from the user equipments to join an IP multicast group and to determine the user equipments in the IP multicast group; or to receive a notification of a network-side entity and to determine the user equipments in the IP multicast group; and
   to transmit the group air interface identity corresponding to the IP multicast group to each user equipment in the IP multicast group in an air interface uni-cast transmission mode.

12. The apparatus according to claim 9, wherein the transceiver schedules the user equipments in the same group to receive the same data via the air interface at the same time-frequency resource location.

13. An apparatus for transmitting data, the apparatus comprising:
   a processor configured to obtain a group air interface identity, configured by a base station, which corresponds to an IP broadcast address or an IP multicast destination address, wherein the group air interface identity is a Group Radio Network Temporary Identity, G-RNTI, wherein the base station is connected a the network side via an IP interface;
   a transceiver configured to receive an IP broadcast data packet or an IP multicast data packet using the group air interface identity;
   wherein the base station configuring the group air interface identity comprises: the base station transmitting the group air interface identity to the user equipment in a downlink transmission bearer configuration command scrambled by a Cell Radio Network Temporary Identity, C-RNTI of the user equipment;
   wherein the IP broadcast data packet or the IP multicast data packet is transmitted data via an air interface over a specific group channel using the group air interface identity by the base station;
   wherein the specific group channel includes a logic channel Group Control Channel, GCCH, a logic channel Group Traffic Channel, GTCH, and a transport channel Group Channel, GCH, wherein the GCCH is configured to carry air interface configuration information of an IP multicast group, the GTCH is configured to carry IP multicast data packets with a same IP multicast destination address and with a same transmission characteristic or transmission characteristics in a same range; and the GCH is a point-to-multipoint transport channel configured to transport IP multicast data to all of user equipments in a group; and wherein the GCCH and the GTCH are mapped to the GCH and further to a Physical Downlink Shared Channel, PDSCH; or the GCCH and the GTCH are mapped to a Downlink Shared Channel, DL-SCH, and further to a Physical Downlink Shared Channel, PDSCH.

14. The apparatus according to claim 13, wherein the group air interface identity corresponds one-to-one to the IP broadcast address or the IP multicast destination address.

15. The apparatus according to claim 14, wherein the processor is further configured:
   to enable a user equipment to enter a connected status and to obtain the Cell Radio Network Temporary Identity, C-RNTI, configured by the base station; and
   to receive a configuration command sent from the base station and to obtain the G-RNTI corresponding to the IP broadcast address.

16. The apparatus according to claim 14, wherein the processor is further configured:
   to enable a user equipment to enter a connected status and to obtain the Cell Radio Network Temporary Identity, C-RNTI, configured by the base station; and
   to transmit uplink data, carrying a request to join an IP multicast group, using the C-RNTI as an air interface transmission identity; and
   to receive a configuration command sent from the base station and to determine the G-RNTI corresponding to the IP multicast destination address of the IP multicast group to which the user equipment belongs.

* * * * *